Figure 1:
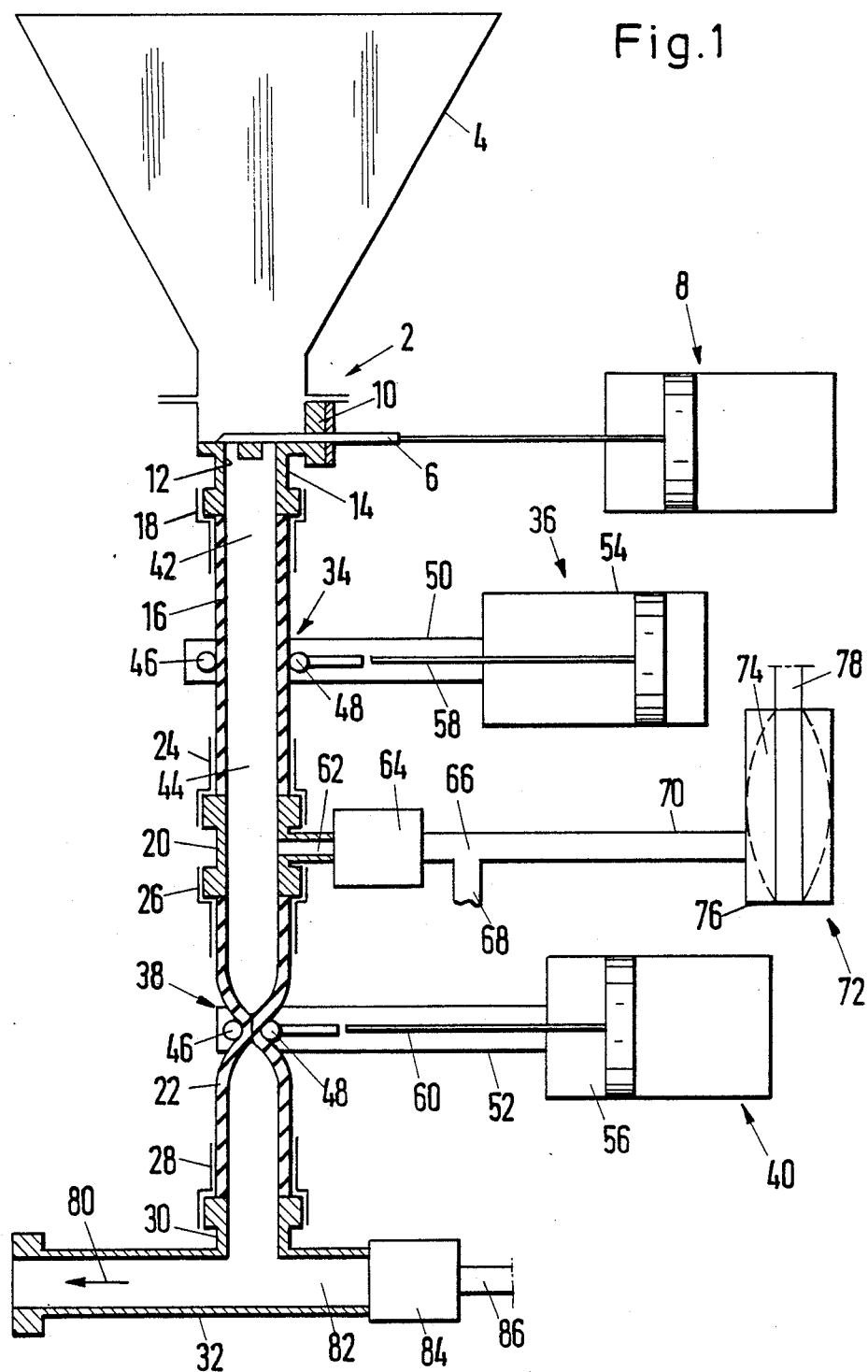

United States Patent [19]

Roehl

[11] Patent Number: 4,893,966
[45] Date of Patent: Jan. 16, 1990

[54] LOCK APPARATUS FOR INTRODUCING DRY GRANULAR MATERIALS INTO A PNEUMATIC CONVEYING CONDUIT AND SPRAY GUN FOR SUCH MATERIALS

[76] Inventor: Franz Roehl, Peter-Boehler-Strasse 3, D-6000 Frankfurt am Main, Fed. Rep. of Germany

[21] Appl. No.: 212,883

[22] Filed: Jun. 29, 1988

[30] Foreign Application Priority Data

Jul. 7, 1987 [DE] Fed. Rep. of Germany ........ 3722314
Jan. 16, 1988 [EP] European Pat. Off. ... EP88100582.1
Jun. 9, 1988 [DE] Fed. Rep. of Germany ... 8807520[U]

[51] Int. Cl.$^4$ ...................... B65G 53/46; B65G 53/40; B65G 53/52; B65G 53/54
[52] U.S. Cl. .................................. 406/127; 406/128; 406/124; 406/109; 406/118; 406/123; 406/194; 406/195; 406/196; 406/191; 406/144; 406/92; 406/85; 137/624.14; 137/624.18; 138/37; 138/39; 222/439
[58] Field of Search ...................... 406/50, 85, 93, 109, 406/118, 96, 123–128, 130, 92, 144, 151, 194–196, 119, 120, 191; 137/624.18, 624.14, 613, 614.19, 812, 872; 251/5, 7; 222/425, 436, 439, 476; 138/37, 39; 366/337, 101, 107, 106; 414/221

[56] References Cited

U.S. PATENT DOCUMENTS

| 2,356,212 | 8/1944 | Burdett et al. | 222/439 X |
| 2,673,011 | 3/1954 | Rood et al. | 222/438 X |
| 2,693,283 | 11/1954 | McClow | 414/221 |
| 2,723,057 | 11/1955 | Golden | 406/126 X |
| 3,190,509 | 6/1965 | Kirchhoefer | 414/221 X |
| 3,352,605 | 11/1967 | McCandless | 406/128 |
| 3,799,622 | 3/1974 | Hek | 406/109 X |
| 4,118,075 | 10/1978 | Lübbehusen | 406/125 X |
| 4,322,054 | 3/1982 | Campbell | 251/5 |
| 4,420,279 | 12/1983 | Easley, Jr. | 406/50 X |

FOREIGN PATENT DOCUMENTS

| 615970 | 6/1935 | Fed. Rep. of Germany | 406/125 |
| 888675 | 7/1953 | Fed. Rep. of Germany | 406/125 |
| 2048524 | 4/1972 | Fed. Rep. of Germany | 406/128 |
| 2051141 | 4/1972 | Fed. Rep. of Germany | 406/128 |
| 2443865 | 3/1976 | Fed. Rep. of Germany | 406/125 |
| 3123283 | 12/1982 | Fed. Rep. of Germany | 406/127 |
| 3528301 | 2/1987 | Fed. Rep. of Germany | 406/128 |
| 3621149 | 1/1988 | Fed. Rep. of Germany | 406/127 |
| 8200992 | 4/1972 | World Int. Prop. O. | 406/124 |

Primary Examiner—Joseph F. Peters, Jr.
Assistant Examiner—James M. Kannofsky
Attorney, Agent, or Firm—Jack Schuman

[57] ABSTRACT

A lock apparatus for introducing granular dry material into a pneumatic conveying conduit (32), for example of a concrete gun, consisting of a material feeding hopper (4) having a shut-off valve (6) actuable by a pneumatic working cylinder (8). Beneath the shut-off valve (6) two hose portions (16 and 22) are arranged in series and on each of said portions a hose squeezing means (34 and 38) engages between which the hose portions (16 and 22) form a lock chamber (44) which is additionally provided with a blowing air connection (62). By the shut-off valve (6) and the upper hose squeezing means (34) an antechamber (42) is formed. When the upper hose squeezing means (34) is closed and the shut-off valve (6) opened the antechamber (42) is filled from the feeding hopper (4) by free fall. At the same time the lock chamber (44) can be discharged into the blow conduit (32) by opening the hose squeezing means (38). The uppermost (6) and lowermost (38) shut-off members then close again and by opening the upper hose squeezing means (34) the contents of the antechamber (42) are discharged into the lock chamber (44). The hose squeezing means (34 and 38) operate against an empty hose. The sole material-contacted shut-off member is the shut-off valve (6). The apparatus otherwise comprises no wearing sealing parts.

4 Claims, 4 Drawing Sheets

LOCK APPARATUS FOR INTRODUCING DRY GRANULAR MATERIALS INTO A PNEUMATIC CONVEYING CONDUIT AND SPRAY GUN FOR SUCH MATERIALS

The invention relates to a lock apparatus for introducing substantially dry granular bulk materials, in particular for substantially dry concrete mixture and similar building materials, into a pneumatic spray conveying conduit. The invention further relates to a placement or spray machine or gun, in particular for dry concrete mixture and similar materials having such a lock apparatus.

Spraying or placement machines for dry and also moist concrete mixtures and similar granular building materials and lining compositions are known. The majority of these known machines employs for locking the more or less fine grain solid material into the pneumatic conveying or spray conduit lock apparatuses which employ a rotating pocket or cell wheel. The lock chambers are arranged within said wheel or rotor and move from a material inlet opening to a material outlet opening each formed as cutout in the housing wall parts otherwise surrounding the cell wheel and laterally fixedly closing the cell chambers within the wheel. Thus, to become filled the individual lock chamber must move to the material inlet opening and is then further advanced into the sealed state until it comes into coincidence with the material outlet opening and in this position generally blasted empty by an air connection at the side opposite the outlet opening. Such machines and apparatuses are for example described in DE-PS 501,941, DE-AS 1,089,327, DE-OS 1,756,085, DE-PS 2,450,245, U.S. Pat. No. 2,481,101 and U.S. Pat. No. 3,076,580.

All these machines have the disadvantage that the considerable constructional expenditure with a rotating component, the associated drive motor and transmission and the sealing means necessary for the rotating component is economically justified only for machines from a certain throughput rate onwards. It is precisely when placing dry concrete in smaller buildings as performed by craftsmen's businesses that very often only relatively small spray powers are required. When such spray powers are achieved with conventional machines the production costs are in no way diminished in proportion to the lower delivery rate required so that the high purchase costs of such machines frequently make their use, desirable in itself, for small businesses and in the aforementioned applications impossible.

The invention is based on the problem of providing a lock apparatus of the type mentioned at the beginning of a spraying machine having such a lock apparatus which is suitable for small throughput rates, is correspondingly economical in production and purchase and has the minimum possible subsequent requirement of expensive wearing parts.

For the aforementioned lock apparatus this problem is solved according to the invention as defined by the claims.

The arrangement of the individual material-carrying parts of the apparatus directly below each other and the construction of the lock chamber shut-off members as hose squeezing means permits on the one hand the extensive utilization of the material conveying within the apparatus by free fall and on the other hand makes it superfluous to use rotatably moved parts with their necessary sealing means and associated rotary drive units.

Because the apparatus has practically no moving sealing parts subjected to wear it remains uniformly sealed, thus permitting operation compatible with a place of work and the environment, until one of the hose portions becomes defective. However, a slowly increasing leakage does not occur. If a hose portion is broken it can be rapidly replaced by means of the screw connections employed. Since the relatively short hose pieces required do not involve high costs they can also be replaced as a precaution in accordance with experience.

The shut-off members are conveniently driven by pneumatic working cylinders. These are firstly substantially cheaper than a motor drive with transmission and secondly can be operated with a form of energy, that is compressed air, which must in any case be present for the spray conveying conduit so that additional electrical power supply for the apparatus is superfluous. Tests have shown that the hose portions used in spite of continuous load under the hose squeezing means achieve relatively high operating lives. In addition, by employing commercially usual hose screw connections the apparatus can be constructed so that the hose portions can be simply and rapidly replaced.

Advantageously, the apparatus is constructed such that the material-conducting parts from the outlet cross-section of the material supply means onwards up to the connecting piece to the spray conveying conduit have, when the shut-off members are open, the same internal diameter throughout so that precisely when conveying the material under the action of gravity unrestricted material feed can take place.

Since for their deformability by the hose squeezing means the hose portions must have a certain minimum length, the lock chamber conveniently consists for the greater part of regions of the two hose portions, i.e. the regions beneath the upper hose squeezing means above the lower hose squeezing means, and of a relatively short intermediate piece which connects the two hose portions together and is conveniently provided with the counter members for the hose screw connection.

In a particularly preferred embodiment the apparatus according to the invention additionally comprises a shut-off valve which is arranged above the upper hose portion conveniently substantially in the outlet cross-section of the material supply means. An antechamber is formed by the region between said shutt-off valve and the upper hose squeezing means.

The operating sequence is such that with closed upper hose squeezing means and open shut-off valve the antechamber is filled by free fall of the material from the material supply means. At the same time the lock chamber disposed beneath the upper hose squeezing means can be discharged by opening the lower hose squeezing means. Before however the upper hose squeezing means is opened for filling the lock chamber the shut-off valve is closed so that only the material from the antechamber can pass to the lock chamber. Under the preferably provided condition that the lock chamber always has a larger volume than the antechamber and the material discharged from the lock chamber to the spray conveying conduit does not pile up, during their closure movement the hose squeezing means fundamentally operate against an empty hose. As a result, the hose squeezing means operate reliably and with adequate sealing of the hose and wear of the hose due to conveyed material in the region of the squeezing means on closing the latter is avoided. The only shut-off member operating against the material is the shut-off valve in the outlet cross-section of the material supply means. Compared with the greater number of constructional parts moved against the material in conventional apparatuses in the apparatus according to the invention the number of such parts has been reduced to a minimum. The shut-off valve may be formed with a hard metal edge and also otherwise constructionally so designed that it fulfils the wear conditions. On the other hand, the operating behaviour of the apparatus is not disturbed should the shut-off valve occasionally not completely close.

To enable the particular filling amounts applied to the lock chamber to be adjusted the upper hose squeezing means is preferably made vertically adjustable with respect to the upper hose portion. This enables the volume of the antechamber to be changed. It should however be ensured that even with the largest antechamber setting the thereby reduced volume of the lock chamber always remains larger than the volume of the antechamber.

In a further preferred embodiment of the apparatus the lock chamber is provided with an air connection which is conveniently attached at the intermediate piece. Although is may well be that the lock chamber when the lower hose squeezing means is open discharges on its own due to the gravity of the material and the certain suction which the pneumatic spray conveying conduit exerts, with short cycle times of the apparatus however problems can arise in the discharging of the lock chamber in that air cannot flow fast enough into the emptying space. For this reason an air supply connecting piece is preferably applied at the lock chamber via which during the discharging region the blowing air for the blow conduit can be diverted. Experience has shown that it is not essential for the air connection to be disposed in the upper region of the lock chamber. The substantially central lateral arrangement on the intermediate piece, avoiding a problematical introduction of the air connection into one of the hose portions, has proved to be equally effective.

According to the present invention the air connection provided with controllable valve means is advantageously employed in several functions. Thus, in the filling of the lock chamber said air connection is switched by the valve means to act as vent connection whilst for the discharge of the lock chamber it is connected to the blowing air.

A problem will all conventional spraying or placement machines for spraying dry concrete mixtures is the dust formation due to imperfectly controllable machine seals. With the present apparatus the sole opening to the environment would be the air connection to the lock chamber if immediately prior to the filling of the lock chamber for reduction of the built-up pressure of the conveying air therein said air connection is switched to venting to the outside. This would cause residues of dust material to be blown out of the lock chamber. To substantially completely eliminate dust discharge here in a preferred embodiment a dust filter element is incorporated into the air connection. Due to the double function of the air connection this dust filter element when it has become covered with a certain amount of dust during filling of the lock chamber is blown free again by the entering blowing air in the subsequent discharge of the lock chamber. In this manner the filter element remains filter-free for a long time. Since conveniently commercially usual filter cartridges are used they can easily be replaced when after a long time they have become useless. The apparatus according to the invention therefore permits an extremely environment-compatible operation which is achieved with the simplest means.

When operating with short cycle times it may occur that simple venting of the lock chamber via the flow resistance of the filter is not sufficient to cause the material to slide from the antechamber rapidly enough into the lock chamber. For this reason, the air connection is conveniently briefly subjected during this operation to reduced pressure. For this purpose a corresponding suction means can be provided in the apparatus which itself is operated with compressed air.

As already mentioned, the actuating means for the hose squeezing means and for the shut-off valves are preferably constructed as pneumatic working cylinders. To ensure a frictionless operating cycle of the apparatus a pneumatic clock control means is provided which controls the actuation sequence of the individual actuating members and functions. This actuating sequence preferably has the following order: starting from a simultaneous closure condition of all three elements the upper hose squeezing means for example first opens and then closes again. Only when it has again reached its closed state do the shut-off valve and the lower hose squeezing means open. Only when these two have again reached their closed state does the upper hose squeezing means open again, etc. The valve means is also to controlled simultaneously therewith. It is switched to the blowing air connection when the lower hose squeezing means opens and after a certain closure time to venting or suction when the lower hose squeezing means is again closed. Depending on the cycle speed of the apparatus it may be expedient to apply the lock chamber to venting or reduced pressure only when the shut-off valve is closed and the upper hose squeezing means is open. Such control sequences can be achieved with the means known to the expert. In a preferred embodiment according to the invention however pneumatic control end switches are provided on the apparatus which ensure automatically the clocked operating cycle so that for starting up the apparatus it is only necessary to open the air supply. These pneumatic control switches are arranged in such a manner that they are directly contacted by parts of the shut-off members or their working cylinders. If for example the upper hose squeezing means reaches its closure position this actuates a control switch which initiates the air supply to the cylinders of the lower hose squeezing means and the shut-off valve. When these members reach their fully opened position they can contact switches which initiate their reversal to a closure movement. When the closure position is reached they again actuate pneumatic switches which again initiate the opening operation of the upper hose squeezing means. The control switches responsible for this may be connected in series in an AND circuit to ensure that the upper hose squeezing means does not open until the two other members have reached their closure position. Of course, other control means are also possible for operating the apparatus but the purely pneumatic embodiment has the advantage that no further power supply connections are required.

To preserve the hose the hose squeezing means conveniently consist of rounded elongated squeezing elements which are arranged parallel to each other on either side of the hose. One of said squeezing elements is connected via a forkshaped linkage to the housing of the associated working cylinder whilst the other is connected to the piston rod. If the cylinder housing were arranged stationary only the squeezing element connected to the piston rod would be moved and the hose would be compressed only from one side against the other stationary squeezing element. To keep the load on the hose symmetrical the housings of the pneumatic working cylinders of the hose squeezing means are therefore mounted in the apparatus with a certain axial movement play. When the squeezing means is closed the housing of the cylinder automatically moves to the closure position. On opening the cylinder housing is moved by a stop (not shown) back to its starting position. As a result the hose is not obstructed during opening.

There are fields of use for the apparatus according to the invention in which the greatest possible continuity of the material charges introduced into the blow conduit is not important. Thus, for example, in metal smelt apparatuses it is usual and necessary to return to the melt the solids retained by the waste gas filter devices. This is done by a carrier gas stream. Since the amounts occurring here are small and as already mentioned a continuous conveying is not important, the lock apparatus in single form is suitable for this task.

The continuity of the material conveying in the blow or blast conduit can be improved in that the generally horizontally extending blow conduit is provided at the side of the connecting piece opposite the blowing direction with a certain dead space with a volume of the order of magnitude of half a lock chamber filling. When the lock chamber filling, assisted by the blowing air, moves downwardly into the blow conduit, due to the impact in the blow conduit part of the material moves of its own accord into the dead space as well. After closing the lower hose squeezing means and switching the blowing air back to the blow conduit the material is conveyed out of the dead space into the blow conduit.

The effect of making the conveyed stream uniform can be still further improved in this embodiment in that the fall or flow path of the material is divided just below the lower hose squeezing means into two parallel paths, one of which opens directly into the blow conduit and the other into the dead space. This can be achieved in practice in that in the middle of the connecting piece a partition extending transversely of the conveying direction is fitted into the conveying conduit which is extended upwardly into the lower hose portion up to just short of the lower hose squeezing means. In this manner, on discharge of the lock chamber part of the material is constrained to move into the dead space, out of which it can be blown after closure of the lock chamber via the upper edge of the partition into the conveying conduit. This step makes the conveying stream extremely uniform for all materials to be handled having specific weights of about 0.4 to 0.3 g/cm$^3$.

To ensure that the dead space always empties completely it is convenient to introduce the blowing air connection at the end of the dead space from below tangentially into said dead space.

In concrete guns or placement machines however a still greater uniformization of the locking-in is desired. Consequently, according to the invention such a machine preferably has two or more of the lock apparatuses according to the invention. If two apparatuses are provided delivering to the same spray conduit then the clock control of the two apparatuses is preferably in alternate rhythm. Since the constructional form of the lock apparatus described may be made very slim these two apparatuses can be arranged closely adjacent each other and associated with a common feed hopper for the material.

If with a double arrangement the effect of a dead space in the blow conduit is to additionally utilized then for each lock apparatus a separate blow conduit portion with associated dead space must be provided. The two blow conduit portions can then led in the form of a breaches piece to a blow conduit. In a machine with double arrangement and in each case delayed introduction of part of the charge volume of each apparatus into the blow conduit it is thus possible with a full working cycle of the total apparatus to introduce four material charges into the common blow conduit and this gives relatively continuous conveying.

For a trouble-free filling of the antechambers of a double arrangement from the material supply means it has proved particularly expedient to connect the antechambers beneath the shut-off valve additionally with each other by an air overflow conduit.

For the use as concrete gun such as aggregate is conveniently constructed as travelling unit which can easily move by hand and which for its operation requires nothing more than a compressed air connection. The overall height can be kept so low that packages with the material to be sprayed can even be emptied by hand into the feed hopper.

Figure 2:
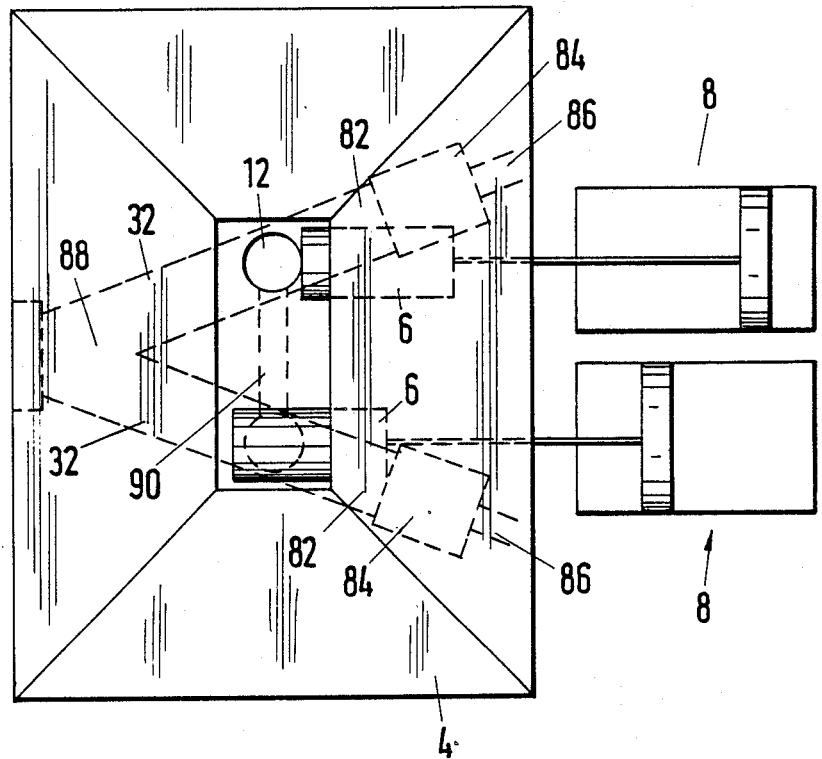
Figure 3:
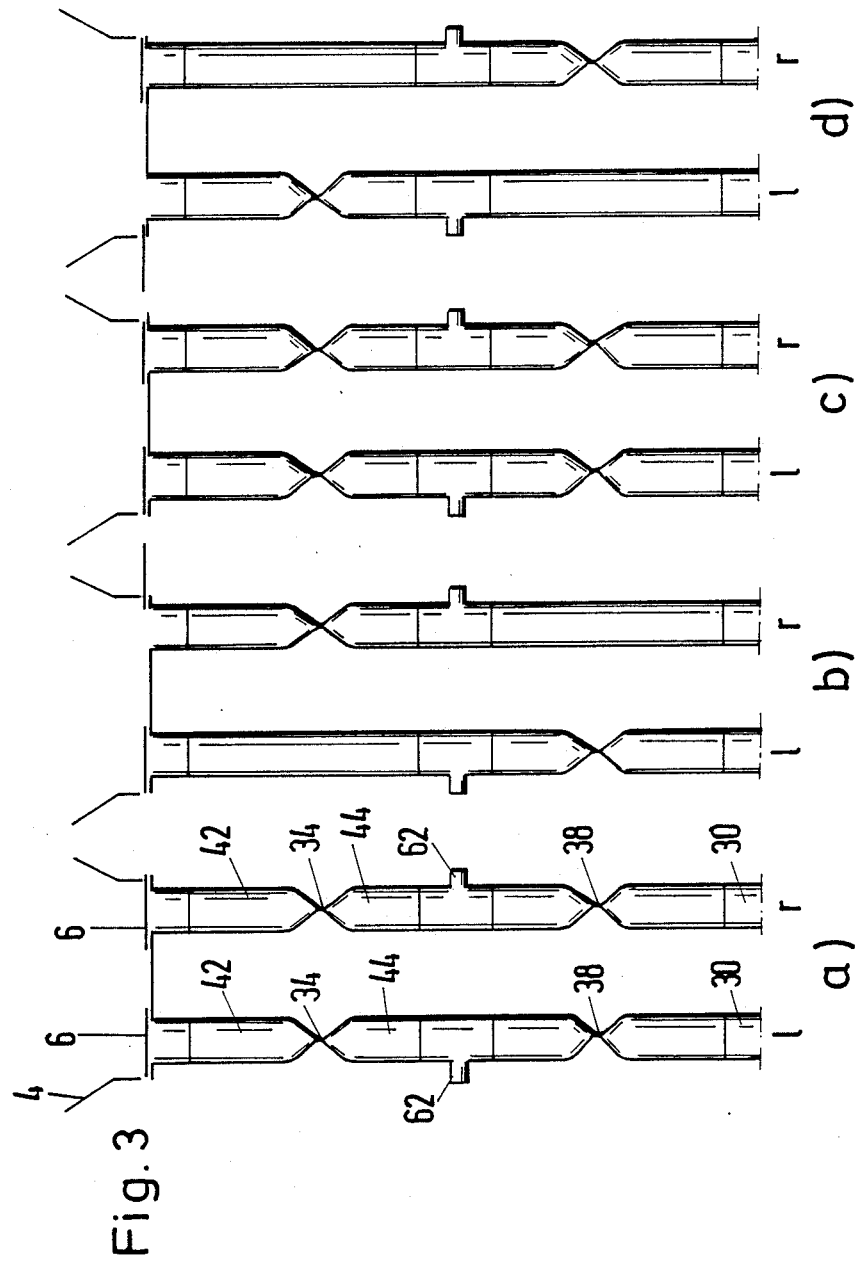
Figure 4:
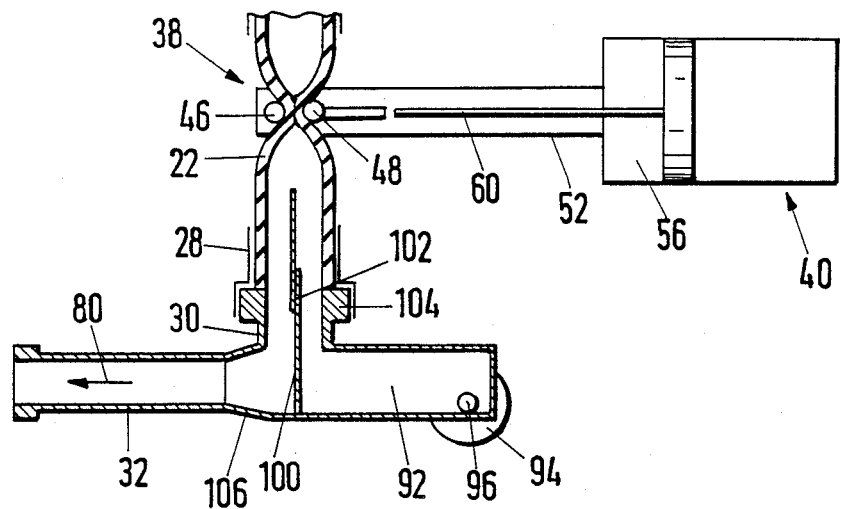
Figure 5:
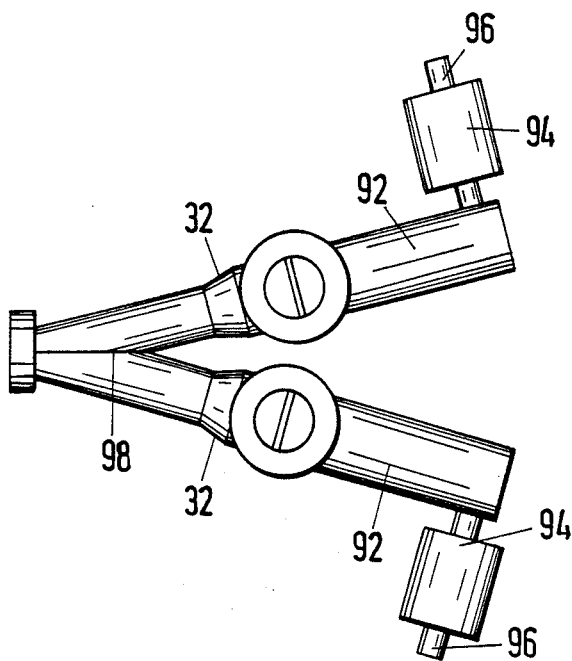

The invention will be explained in detail hereinafter with the aid of the attached merely schematic drawings, wherein:

FIG. 1 shows the schematic structure of a lock apparatus in side elevation,

FIG. 2 is a schematic plan view of the material feed hopper for two lock apparatuses working in parallel, FIG. 3 illustrates four consecutive operating states for two lock apparatuses working in parallel, FIG. 4 is a schematic side elevation of the lower region of a modified embodiment of the lock apparatus, and FIG. 5 shows the conveying conduit arrangement of a machine having two lock apparatuses of the construction of FIG. 4 operating in parallel.

The lock apparatus illustrated in schematic side elevation in FIG. 1 comprises a material supply means 2 having a material feed hopper 4 which can be closed at its lower end by a shut-off slide valve 6, which is provided with a pneumatic working cylinder 8 as actuating means. Via a sealing arrangement 10 the shut-off slide valve 6 enters the lower end of the feed hopper 4 and can thus close the outlet cross-section 12 of the material supply means 2. By means of a tube connecting piece 14 as adapter piece the material supply means 2 is followed at the bottom by a first upper hose portion 16 which is connected by means of a known detachable hose screw connection 18 to the adapter piece 14. The lower end of the hose portion 16 is followed by an intermediate piece 20 which is followed by a second lower hose portion 22 which has substantially the same dimensions as the upper hose portion 16. The two hose portions 16 and 22 are connected via hose screw connections 24 and 26 to the intermediate piece 20 which is arranged like the material supply means fixed with respect to the frame. Finally, the lower end of the lower hose portion 22 is connected via a hose screw connection 28 to a tubular connecting piece 30 which opens into a pneumatic spray conveying conduit 32.

Substantially in the centre of the upper hose portion 16 a first upper hose squeezing means is provided which is actuable by means of a pneumatic working cylinder 36. Correspondingly, substantially in the centre of the lower hose portion 22 a second lower means 38 is provided which is actuable by means of a pneumatic working cylinder 40.

The inner space of the tubular connecting piece 14 and the upper hose portion 16 lying between the shut-off valve 6 and the upper hose squeezing means 34 forms an antechamber 42. The inner space of the hose portions 16 and 22 and of the intermediate piece 20 lying between the upper squeezing means 34 and the lower squeezing means 38 forms a lock chamber 44.

The hose squeezing means 34 and 38 each comprise two elongated and rounded squeezing elements 46 and 48. The squeezing elements 46 are connected via forked arm pairs 50 and 52 respectively to the housing 54 and 56 of the working cylinders 36 and 40 whilst the squeezing elements 48 are connected to the piston rods 58 and 60 of the working cylinders 36 and 40 respectively. To permit a symmetrical closure movement of the hose squeezing means as indicated as example for the lower hose squeezing means 38 in FIG. 1 the housing 54 and 56 of the working cylinders 36 and 40 are mounted axially displaceably in the frame (not shown) of the apparatus.

The lock chamber 44 is provided at the intermediate piece 20 with an air connection 62 in which a dust filter element 64 is arranged which on venting of the lock chamber for diminishing the built-up pressure holds back dust entrained immediately prior to the filling and thus avoids contamination of the environment. The retention function of the filter also occurs when the air connection is connected to the suction connection.

At the point 66 the air connection conduit 62 is provided with a blowing air connection 68 and a vacuum or suction connection 70. At the point 66 changeover valves (not shown), preferably three-way valves, are disposed with which the air connection 62 can be selectively closed, vented or connected to the blowing air connection 68 or the suction connection 70.

72 denotes a means connected to the suction connection 70 for brief generation of a reduced pressure. The reduced pressure means consists of a body 74 which can be inflated against its elastic material recovery force by means of compressed air and which is arranged in a closed housing 76 which is connected to a suction conduit 70 and to a vent connection (not shown). The body 74 is inflated when the housing 76 is vented via an inflation connection 78, whereupon the housing 76 is closed. If then when required the inflation connection 78 is opened towards the surroundings the body 74 contracts under its inherent elasticity and generates a reduced pressure in the housing 76 and in the suction connection 70. The volume change of the body 74 is adapted to the necessary inspiration volume from the lock chamber 44.

As apparent from FIG. 1 the conveying conduit 32 is provided at the side of the connecting piece 30 opposite the conveying direction 80 with a dead space 82 which is connected via a filter element 84 to a blowing air connection 86.

FIG. 2 represents a schematic plan view of a spraying machine having two adjacently disposed lock apparatuses which are fed from a common material feed hopper 4. The two shut-off slide valves 6 and the associated working cylinders 8 are indicated. It can also be seen that each of the two apparatuses is provided with its own conveying conduit portion 32 and that said two conveying conduit portions are united via a breeches tube 88 to give a common conveying conduit. The antechambers 42 are connected together beneath the shut-off valves by an overflow conduit 90.

For the hose portions 16 and 22 reinforced pressure hoses as are generally used as hose lines in concrete placement have proved themselves. These are hoses having an artificial fibre reinforcement which is disposed near the periphery of the hose whilst the inner region of the hose has relatively thick deformable elastomeric layer which in the case of the hose employed has a thickness of about 7 mm. Due to this thick deformable inner layer, even in the squeezed state the reinforcement of the hose undergoes at the sides only a curvature having a radius of curvature from 5 to 10 mm. The hoses used had an outer diameter in the range of about 70 mm.

In FIGS. 4 and 5 the lower part of a modified embodiment of the lock apparatus according to FIGS. 1 and 2 is illustrated.

As apparent from FIG. 4, as in the construction of FIG. 1 the conveying conduit 32 is provided at the side of the connecting piece 30 opposite the conveying direction 80 with a dead space 92 which is connected via a filter element 94 to a blowing air connection 96.

Deviating from the embodiment of FIG. 1, in the embodiment of FIG. 4 in the tubular connecting piece 30 a partition 100 is disposed which runs transversely of the conveying direction 80 and which extends up to the bottom of the conveying conduit 32 and substantially completely blocks off the latter in the axial direction (see FIG. 5). As apparent from FIG. 4 the partition 100 is extended upwardly and projects from below into the lower hose portion 22 up to just short of the lower hose squeezing means 38. The partition 100 is divided at the point 102 located substantially at the height of the flange 104 of the connecting piece 30, the two parts of the partition 100 overlapping at this point to improve the connectability. The division expedient for assembly reasons also however has the advantage that the upper portion of the partition 100 can be mounted at different heights on the lower portion. Should this encounter difficulties said portion can also be replaced by a portion of a different height should this appear necessary for flow reasons.

The partition divides the connecting piece 30 and the lower end of the lower hose portion 22 into two parallel connection paths of substantially the same cross-section as shown in FIG. 5. To avoid velocity reductions in the conveying flow the conveying conduit 32 comprises at the point 106 a tapering so that the cross-section of the conveying conduit at the point of the arrow 80 corresponds substantially to the cross-section of a partial flow path in the connecting piece 30.

As further apparent from the drawings the blowing air connection 96 at the end of the dead space 92 is disposed at the lower side thereof and introduced tangentially into said dead space so that in the blowing out of the dead space a helical flow is formed therein which entrains all the material from the dead space 92 beyond the partition 100 into the conveying conduit 32.

It is apparent from FIG. 5 that the apparatus described comprises two lock arrangements according to FIG. 4 adjacent each other and having conveying conduits 32 which are brought together in the form of a breeches tube piece 98.

The mode of operation in the outlet region of the apparatus is such that when the lower hose squeezing means is opened for discharging the lock chamber 44 the blowing air at the blowing air connection 96 of the dead space is disconnected and blowing air is supplied via the connection 62 to the lock chamber. The material emerging from the lock chamber 44 downwardly is divided by the partition 100 directly beneath the lower hose squeezing means into two partial amounts which are as equal as possible and of which the one passes substantially by free all into the dead space 92 whilst the other is blown by the blowing air into the conveying conduit 32. After discharging of the lock chamber 44 the lower hose squeezing means is closed and the blowing air is switched from the connection 62 to the connection 96 at the dead space 92. There then arises in the dead space a helical air stream which entrains the material disposed therein and blows it past the partition 100 into the conveying conduit 32.

The operating cycle of a spraying machine or gun having two parallel lock apparatuses operating alternately will now be explained briefly with reference to the schematic illustration of FIG. 3 in which four successive operating states a, b, c and d are shown for in each case the left lock apparatus 1 and the right lock apparatus r. Firstly, only the left lock apparatus 1 will be considered in each case. In the state a both the shut-off valve 6 and the hose squeezing means 34 and 38 are in the closure position. It will be assumed that the shut-off valve 6 and the lower hose squeezing means 38 have just closed. The antechamber 42 has been filled with material and the lock chamber 44 discharged downwardly. The upper hose squeezing means 34 (state b) now opens and the material drops from the antechamber 42 into the lock chamber 44. The upper hose squeezing means 34 closes again (state c) and when it is closed the shut-off valve 6 and the lower hose squeezing means 38 open (state d). The lock chamber 44 is thereby discharged downwardly into the tubular connecting piece 30 and the antechamber 42 again filled from the feed hopper 4. Thereafter the shut-off valve 6 and the lower hose squeezing means 38 close again and the state a results and the same cycle then starts again from said state. The cycle of the right lock apparatus r is phase-displaced in each case by two illustrated positions. The state a of the right apparatus corresponds to the state c of the left apparatus. Otherwise, the cycle is the same. Whereas in position b the right lock chamber 44 is discharged into the connecting piece 30 in position d the left lock chamber 44 is discharged into the connecting piece so that between the states in which the shut-off members of both apparatuses are all closed (states a and c) the one and the other apparatus alternately discharges its material into the conveying conduit.

The control of the air connection 62 by the valve means 66 in an embodiment of a lock apparatus as illustrated in FIG. 1 is conveniently such that the blowing air at the start of the opening of the lower hose squeezing means 38 is switched from the blowing air connection 86 at the conveying conduit 32 completely to the blowing air conduit 68 at the air connection 62 to blow the contents of the lock chamber 44 out into the conveying conduit 32. If at the same time the blowing air connection 86 at the conveying conduit 32 is switched to venting the conveyed material will be blown partially into the dead space 82, part of the blowing air escaping via the filter 84 and the blowing air connection 86 into the atmosphere. Just before the lower hose squeezing means 38 has again reached the closure state the blowing air is switched from the blowing air connection 68 at the air connection 62 back to the blowing air connection 86 at the conveying conduit 32.

As a result the part of the material disposed in the dead space 82 is now blown with delay into the conveying conduit 32 and the filter 84, by which material was held back when the dead space 82 was filled, is simultaneously blown free into the conveying conduit 32.

When the lower hose squeezing means 38 has closed completely the air connection 62 at the lock chamber 44 is switched to venting to allow any excess pressure to escape from the lock chamber via the filter 64. If a reduced pressure means 72 is employed as indicated in FIG. 1 the elastic body 74 can be simultaneously inflated. As soon as the upper squeezing means opens the air connection 62 is switched from its venting position to the suction connection 70, the inflation connection 78 of the reduced pressure means 72 being simultaneously vented.

In a double arrangement of the apparatus with a breeches tube 88 according to FIG. 2 it is advantageous to switch the blowing air in each case only to the blowing air connection 86 of the apparatus which is in the discharging phase of the lock chamber 44. The switch-over can for example be made during the states (a) and (c) in FIG. 3.

As already mentioned, the entire pneumatic sequence control of the apparatus can be carried out partially by pneumatic end switches which are actuated by the individual shut-off members or their actuating cylinders in their respective end positions. To obtain on movement reversal of the hose squeezing means certain dead time during which the air path reversals and the material movements can take place the shut-off valve may for example be moved with delay into and out of its end positions so that the end switches actuated thereby as practically higher priority control switches initiate the next cycle phase of the apparatus again only with delay.

In a prototype of a concrete gun having two parallel lock apparatuses hose material with an internal diameter of 50 mm was used. The filling volume per cycle was about 0.55 1. With about 30 locking-out operations of the double apparatus per minute a delivery of about 1 m$^3$/h was reached. The cycle time of the double apparatus was about 2 sec and that of each individual component about 4 sec.

The fact that decisive regions of the lock apparatus consist of hose portions and said hose portions are periodically deformed by means of the hose squeezing means contributes to avoiding a buildup of material in the apparatus due to bridge formation and adhering to the chamber walls.

What is claimed is:

1. Lock apparatus for introducing substantially dry granular bulk materials, in particular for substantially dry concrete mixtures and similar building materials, from a material supply means into a pneumatic spray conveying conduit wherein said lock apparatus comprises a lock chamber, a tubular connecting piece communicating with the pneumatic spray conveying conduit, first conduit means interposed between and in communicating relationship with the material supply means and the lock chamber, and second conduit means interposed between and in communicating relationship with the lock chamber and the tubular connecting piece, the said materials passing from the material supply means through the first conduit means, the lock chamber, the second conduit means, the tubular connecting piece and thence into the pneumatic spray conveying conduit, characterized in that:
- (a) the lock chamber (44) is positioned below the material supply means (2) and above the tubular connecting piece (30),
- (b) an upper hose (16) defines said first conduit means,
- (c) a lower hose (22) defines said second conduit means,
- (d) inlet shut-off means (34) are provided between said lock chamber (44) and said material supply means (2), said inlet shut-off means (34) being adapted to engage the exterior of upper hose (16) to close or selectively to open said upper hose (16),
- (e) first operating means (36) operatively connected to said inlet shut-off means (34) are provided and are adapted to actuate said inlet shut-off means (34) to close or selectively to open said upper hose (16),
- (f) outlet shut-off means (38) are provided between said lock chamber (44) and said tubular connecting piece (30), said outlet shut-off means (38) being adapted to engage the exterior of lower hose (22) to close or selectively to open said lower hose (22),
- (g) second operating means (40) operatively connected to said outlet shut-off means (38) are provided and are adapted to actuate said outlet shut-off means (38) to close or selectively to open said lower hose (22),
- (h) said tubular connecting piece (30) communicates with said spray conveying conduit (32) at a location between ends of said spray conveying conduit (32),
- (i) a partition (100) is provided transversely within said spray conveying conduit (32) to define therein a first passageway for said materials leading to one end of said spray conveying conduit (32) and a second passageway leading to a chamber (92) adjacent the opposite end of said spray conveying conduit (32),
- (j) a blowing air connection (96) is provided in communication with said chamber (92).

2. Apparatus as in claim 1, wherein:
- (k) said partition (100) extends upwardly through said tubular connecting piece (30) and into said lower hose (22) to a point below said outlet shut-off means (38).

3. Apparatus as in claim 2, wherein:
- (1) the partition (100) is formed in two portions which are secured to each other at a point (102) substantially in the plane in which the upper end of said tubular connecting piece (30) and the lower end of said lower hose (22) are connected to each other.

4. Spraying apparatus for substantially dry concrete mixtures or similar building materials, characterized in that it comprises a plurality of lock apparatuses, each lock apparatus being adapted to deliver such materials from a material supply means into a pneumatic spray conveying conduit, each lock apparatus comprising a lock chamber, a tubular connecting piece communicating with the pneumatic spray conveying conduit, first conduit means interposed between and in communicating relationship with the material supply means and the lock chamber, and second conduit means interposed between and in communicating relationship with the lock chamber and the tubular connecting piece, the said materials passing from the material supply means through the first conduit means, the lock chamber, the second conduit means, the tubular connecting piece into the pneumatic spray conveying conduit, each lock apparatus being characterized by:
- (a) the lock chamber (44) is positioned below the material supply means (2) and above the tubular connecting piece (30),
- (b) an upper hose (16) defines said first conduit means,
- (c) a lower hose (22) defines said second conduit means,
- (d) inlet shut-off means (34) are provided between said lock chamber (44) and said material supply means (2), said inlet shut-off means (34) being adapted to engage the exterior of upper hose (16) to close or selectively to open said upper hose (16),
- (e) first operating means (36) operatively connected to said inlet shut-off means (34) are provided and are adapted to actuate said inlet shut-off means (34) to close or selectively to open said upper hose (16),
- (f) outlet shut-off means (38) are provided between said lock chamber (44) and said tubular connecting piece (30), said outlet shut-off means (38) being adapted to engage the exterior of lower hose (22) to close or selectively to open said lower hose (22).
- (h) said tubular connecting piece (30) communicates with said spray conveying conduit (32) at a position between ends of said spray conveying conduit (32),
- (i) a partition (100) is provided transversely within said spray conveying conduit (32) to define therein a first passageway for said materials leading to one end of said spray conveying conduit (32) and a second passageway leading to a chamber (92) adjacent the opposite end of said spray conveying conduit (32),
- (j) a blowing air connection (96) is provided in communication with said chamber (92), said spraying apparatus being characterized in that:
- (k) said plurality of lock apparatuses are actuable in phase-displaced timing,
- (l) an air overflow conduit (90) connects those portions of upper hose (16) above the inlet shut-off means (34) of all of said plurality of lock apparatuses.

* * * * *